(12) United States Patent
Krasnov et al.

(10) Patent No.: US 7,862,927 B2
(45) Date of Patent: Jan. 4, 2011

(54) THIN FILM BATTERY AND MANUFACTURING METHOD

(75) Inventors: Victor Krasnov, Tarzana, CA (US); Kai-Wei Nieh, Monrovia, CA (US); Jianchao Li, El Monte, CA (US)

(73) Assignee: Front Edge Technology, Baldwin Park, CA (US)

(*) Notice: Subject to any disclaimer, the term of this patent is extended or adjusted under 35 U.S.C. 154(b) by 958 days.

(21) Appl. No.: 11/681,754

(22) Filed: Mar. 2, 2007

(65) Prior Publication Data

US 2008/0213664 A1 Sep. 4, 2008

(51) Int. Cl.
| | |
|---|---|
| H01M 6/10 | (2006.01) |
| H01M 4/00 | (2006.01) |
| H01M 4/50 | (2006.01) |
| H01M 4/58 | (2006.01) |
| C23C 14/00 | (2006.01) |

(52) U.S. Cl. .............. 429/162; 429/221; 429/223; 429/224; 429/231.5; 429/231.95; 204/192.15

(58) Field of Classification Search .......... 429/162, 429/221, 223, 224, 231.5, 231.95, 232, 233; 204/192.17, 192.15; 427/77, 126.2; 29/623.5
See application file for complete search history.

(56) References Cited

U.S. PATENT DOCUMENTS

| | | | |
|---|---|---|---|
| 3,375,135 A | 3/1968 | Moulton et al. | |
| 3,414,685 A | 12/1968 | Geib et al. | |
| 3,530,007 A | 9/1970 | Golubovic | |
| 3,844,841 A | 10/1974 | Baker | |
| 3,969,142 A | 7/1976 | Greatbatch et al. | |
| 3,993,508 A | 11/1976 | Erlichman | |
| 4,119,769 A | 10/1978 | Schneider et al. | |
| 4,309,494 A | 1/1982 | Stockel | |
| 4,421,835 A | 12/1983 | Manassen et al. | |
| 4,459,328 A | 7/1984 | Mizuhara | |
| 4,543,441 A | 9/1985 | Kumada et al. | |
| 4,565,753 A | 1/1986 | Goebel et al. | |

(Continued)

FOREIGN PATENT DOCUMENTS

CN 1661354 A 8/2005

(Continued)

OTHER PUBLICATIONS

Bates et al., "Preferred orientation of polycrystalline LiCoO2 films" J. of the Electrochemical Society (2000), pp. 59-70, Issue No. 147 (1).

(Continued)

*Primary Examiner*—Patrick Ryan
*Assistant Examiner*—Thomas H. Parsons
(74) *Attorney, Agent, or Firm*—Janah & Associates P.C.; Ashok K. Janah

(57) ABSTRACT

In a method of fabricating a battery, a substrate is annealed to reduce surface contaminants or even water of crystallization from the substrate. A series of battery component films are deposited on a substrate, including an adhesion film, electrode films, and an electrolyte film. An adhesion film is deposited on the substrate and regions of the adhesion film are exposed to oxygen. An overlying stack of cathode films is deposited in successive deposition and annealing steps.

49 Claims, 8 Drawing Sheets

U.S. PATENT DOCUMENTS

| | | |
|---|---|---|
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,597,660 A | 1/1997 | Bates et al. |
| 5,612,152 A | 3/1997 | Bates et al. |
| 5,656,364 A | 8/1997 | Rickerby et al. |
| 5,670,252 A | 9/1997 | Makowiecki et al. |
| 5,670,272 A | 9/1997 | Cheu et al. |
| 5,700,551 A | 12/1997 | Kukino et al. |
| 5,705,293 A | 1/1998 | Hobson |
| 5,705,297 A | 1/1998 | Warren |
| 5,786,582 A | 7/1998 | Roustaei et al. |
| 5,824,374 A | 10/1998 | Bradley, Jr. et al. |
| 5,871,865 A | 2/1999 | Barker et al. |
| 5,894,656 A | 4/1999 | Menon et al. |
| 5,961,672 A | 10/1999 | Skotheim et al. |
| 5,985,485 A | 11/1999 | Ovshinsky et al. |
| 6,017,654 A | 1/2000 | Kumta et al. |
| 6,022,640 A | 2/2000 | Takada et al. |
| 6,118,248 A | 9/2000 | Gartstein et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,517,968 B2 | 2/2003 | Johnson |
| 6,558,836 B1 | 5/2003 | Whitacare et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,713,987 B2 | 3/2004 | Krasnov et al. |
| 6,863,699 B1 | 3/2005 | Krasnov et al. |
| 6,921,464 B2 | 7/2005 | Krasnov et al. |
| 6,940,988 B1 | 9/2005 | Shennib et al. |
| 7,037,621 B2 | 5/2006 | Kikuchi et al. |
| 7,056,620 B2 | 6/2006 | Krasnov et al. |
| 2001/0041294 A1 | 11/2001 | Chu et al. |
| 2002/0004167 A1 | 1/2002 | Jenson et al. |
| 2002/0028384 A1 | 3/2002 | Krasnov et al. |
| 2002/0071989 A1 | 6/2002 | Verma et al. |
| 2002/0110733 A1 | 8/2002 | Johnson |
| 2002/0156823 A1 | 10/2002 | Breitkopf et al. |
| 2003/0121142 A1 | 7/2003 | Kikuchi et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0130032 A1 | 6/2005 | Krasnov et al. |
| 2005/0156573 A1 | 7/2005 | Lin |
| 2006/0040169 A1 | 2/2006 | Liu et al. |
| 2006/0040170 A1 | 2/2006 | Liu et al. |
| 2006/0068258 A1 | 3/2006 | Kinoshita |
| 2006/0115706 A1 | 6/2006 | Maeda et al. |
| 2006/0216589 A1 | 9/2006 | Krasnov et al. |
| 2007/0037054 A1 | 2/2007 | Kikuchi et al. |
| 2007/0047750 A1 | 3/2007 | Sauer et al. |
| 2007/0166612 A1 | 7/2007 | Krasnov et al. |
| 2008/0263855 A1 | 10/2008 | Li et al. |
| 2009/0010462 A1 | 1/2009 | Ekchian et al. |
| 2009/0057136 A1* | 3/2009 | Wang et al. ............ 204/192.15 |
| 2009/0136839 A1* | 5/2009 | Kraznov et al. ............ 429/160 |

FOREIGN PATENT DOCUMENTS

| | | |
|---|---|---|
| EP | 0 829 913 A | 3/1998 |
| EP | 1 458 037 A | 9/2004 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61195563 A | 8/1986 |
| JP | 09-259929 A | 10/1997 |
| JP | 2001-044073 | 2/2001 |
| JP | 2003-249199 A | 9/2003 |
| WO | WO-95/14311 A | 5/1995 |
| WO | WO-99/23714 | 5/1999 |
| WO | WO-00/60689 A | 10/2000 |
| WO | WO-01/73873 A | 10/2001 |
| WO | WO-02/21627 A3 | 3/2002 |
| WO | WO-02/42516 A3 | 5/2002 |
| WO | WO-03/005477 A3 | 1/2003 |
| WO | WO-03/061049 A | 7/2003 |
| WO | WO-03/073531 A3 | 12/2003 |
| WO | WO-2006/105188 A1 | 10/2006 |
| WO | WO-2006/105050 A3 | 3/2007 |
| WO | WO-2008/108999 A3 | 11/2008 |
| WO | WO-2008/134053 A1 | 11/2008 |

OTHER PUBLICATIONS

Roh et al., "Effects of deposition condition on the ionic conductivity . . ." Scripta Materialia, Dec. 17, 1999, pp. 43-49, vol. 42. No. 1, New York, NY.

Bolster et al., "Investigation of lithium intercalation metal oxides for thermalbatteries" Proceedings of the 34th Int'l Power Source Symposium, Jun. 25-28, 1990, pp. 136-140.

Wagner et al., "Fabrication and Testing of thermoelectric thin film devices" 15th Int'l Conf. on Thermoelectrics, Mar. 26-29, 1996, pp. 269-273.

Neudecker et al., "Lithium-Free Thin-Film Battery . . . " Journal of the Electrochemical Society (2000), pp. 517-523, Issue No. 147 (2).

Park et al., "Characterization of tin oxide/LiMn2O4 thin-film cell," Journal of Power Sources, Jun. 2000, pp. 250-254, vol. 88, No. 2, Elsevier Science S.A.

Yang et al., "Effect of annealing temperature on structure and electrochemical properties of $LiCoO_2$ cathode thin films", Rare Metals, vol. 25, Dec. 2006, pp. 189-192.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

Antaya et al. "Preparation and Characterization of $LiCoO_2$ Thin Films by Laser Ablation Deposition", J. Electrochem. Soc., vol. 140, No. 3, Mar. 1993, pp. 575-578.

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Jenson, Mark, U.S. Appl. No. 60/191,774, "Comprehensive patent for the fabrication of a high volume, low cost energy products such as solid state lithium ion rechargeable battery, supercapacitors and fuel cells", filed Mar. 24, 2000.

Jenson et al., U.S. Appl. No. 60/225,134, "Apparatus and method for rechargeable batteries and for making and using batteries", Aug. 14, 2000.

Jenson et al., U.S. Appl. No. 60/238,673, "Battery Having Ultrathin Electrolyte", filed Oct. 6, 2000.

PCT International Search Report in Application No. PCT/US2008/013213 (WO 2009/073150 A1), mailed Jun. 18, 2009.

Krasnov et al., U.S. Appl. No. 11/946,819, "Thin Film Battery Comprising Stacked Battery Cells and Method", filed Nov. 28, 2007.

Nieh et al., U.S. Appl. No. 12/032,997, "Thin Film Battery Fabrication Using Laser Shaping", filed Feb. 18, 2008.

* cited by examiner

THIN FILM BATTERY AND MANUFACTURING METHOD

BACKGROUND

Embodiments of the present invention relate to a method of manufacturing a thin film battery.

A thin film battery typically comprises a substrate having one or more battery component films that include an electrolyte sandwiched between electrode films such an anode, cathode, and/or current collector films, that cooperate to store electrical charge and generate a voltage. The battery component films that are typically less than 100 microns allowing the thin film batteries to be less than about $\frac{1}{100}^{th}$ of the thickness of conventional batteries. The battery component films are formed by processes, such as for example, physical and chemical vapor deposition (PVD or CVD), oxidation, nitridation, and electroplating.

However, conventional battery component films and substrate materials often limit the maximum levels of energy density and specific energy levels that can be obtained from the battery. The energy density level is the fully charged output energy level per unit volume of the battery. The specific energy level is the fully charged output energy level per unit weight of the battery. Conventional batteries typically achieve energy density levels of 200 to 350 Whr/L and specific energy levels of 30 to 120 Whr/L. This is because conventional substrates, such as $Al_2O_3$, $SiO_2$, are relatively heavy and reduce the energy to weight ratio of the battery. Also, the battery component films of conventional batteries often fail to provide sufficiently high energy storage levels. It is desirable to have a thin film battery comprising component films on a substrate that provide higher energy density and specific energy levels to provide more power per unit weight or unit volume of the battery.

In one type of battery, higher specific energy levels are achieved using a thick cathode film which can have a thickness of 5 microns or more. The thick cathode films provides greater charge retention and faster charging and discharging rates. However, it is difficult to fabricate a thick cathode film on a substrate as the thick film will delaminate easily or cause surrounding battery component films to peel off. Typically, a cathode film is deposited as an amorphous or microcrystalline film in a single pass deposition process, and thereafter, crystallized by heating the film. For example, a cathode film comprising lithium cobalt oxide can be crystallized at temperatures of about 700° C. to obtain a thick, crystalline cathode film. However, the high crystallization temperatures needed to effectively crystallize the thicker cathode film, and the higher dimensional thickness of the film itself, causes high thermal stresses to arise from the differences in thermal expansion coefficients of the substrate and cathode materials. These stresses cause delamination and peeling off of the cathode film or even entire thin film battery structures formed over or under the cathode film. The relatively high crystallization temperatures also constrain the types of materials that may be used to form the other battery component films as these materials should not soften, melt, oxidize, or interdiffuse at the cathode crystallization temperatures. Thus, conventional methods are often deficient in their ability to fabricate a thick crystalline cathode film for a thin film battery.

Delamination of the thick cathode films (or other films) can be reduced by applying an adhesion film on the substrate before the deposition of the cathode films. However, adhesion films are often electrically conducting films, such as metal films, and these films can cause short circuits in or between battery cells formed on the substrate when there is electrical contact between the metal adhesion film and overlying films. Insulating adhesion films, such as $Al_2O_3$ have also been used, however, ceramic insulating materials often have complex deposition processes and do not always provide as good adhesion to the substrate or overlying films as the metal adhesion films.

Thus it is desirable to have a thin film battery capable of providing higher energy density and specific energy levels. It is also desirable to have thicker cathode films. It is further desirable to reduce processing temperatures, such as crystallization temperatures, in the fabrication of the battery component films, and especially in the fabrication of the cathode films. It is also desirable to reduce the delamination of battery component films, such as electrode or other films and overlying structures.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

Figure 9:
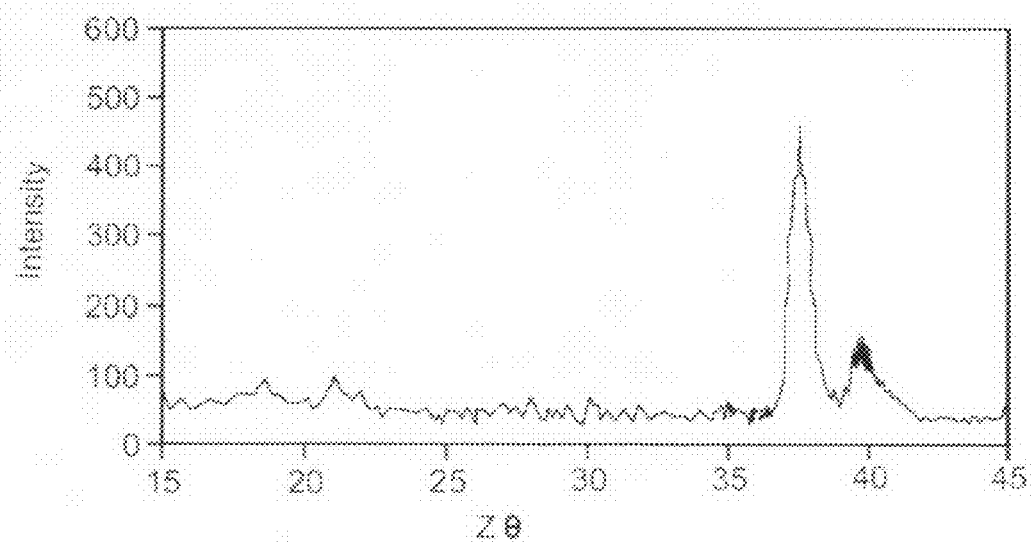
Figure 10:
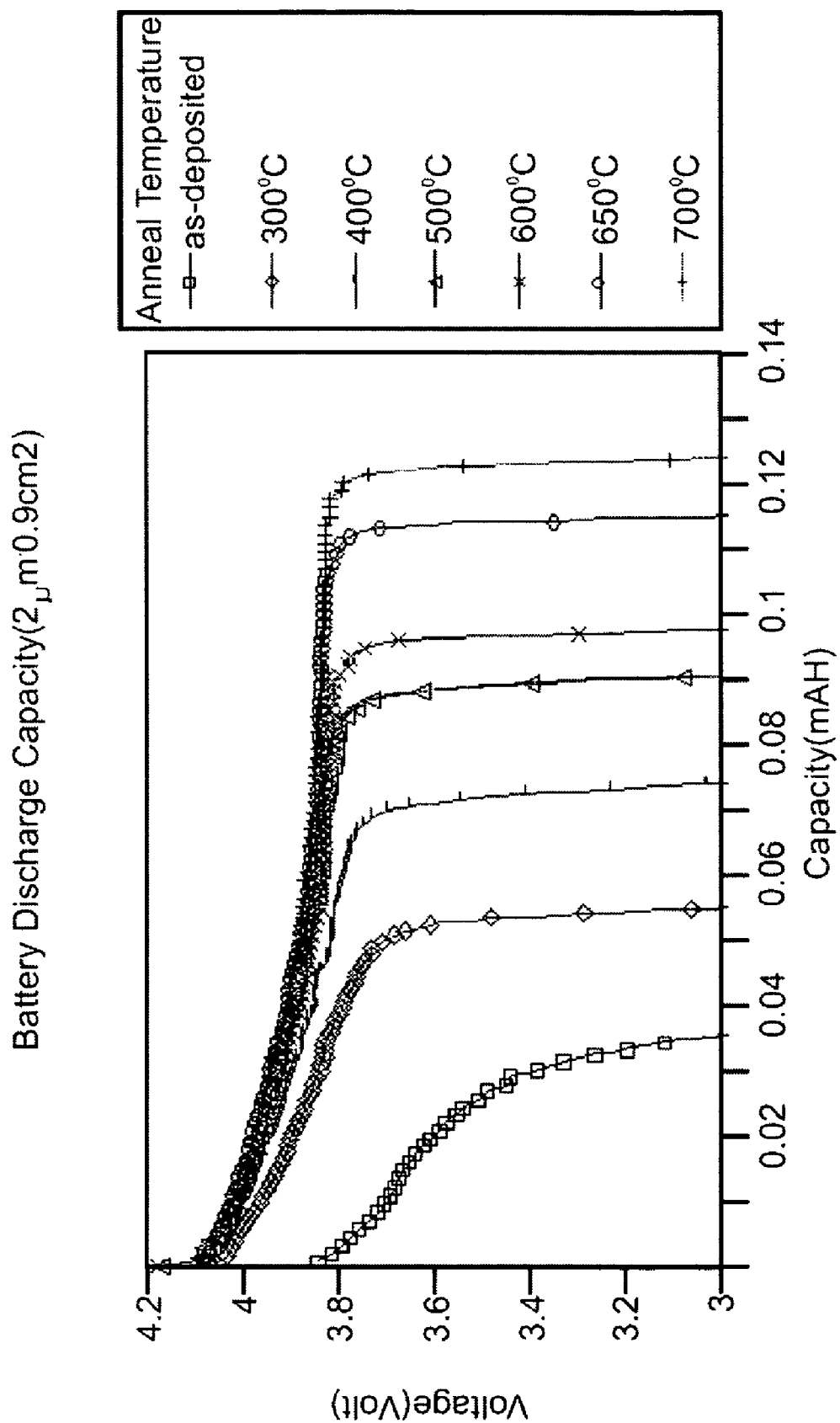

FIG. 9 is an x-ray diffraction pattern of an as-deposited cathode film comprising lithium cobalt oxide showing that the film is highly crystalline and with a (110) preferred orientation; and FIG. 10 is a graph showing a number of current discharge plots of thin film batteries that each comprise a cathode film of crystalline lithium cobalt oxide that is as-deposited or annealed at different temperatures.

DESCRIPTION

Figure 1A:
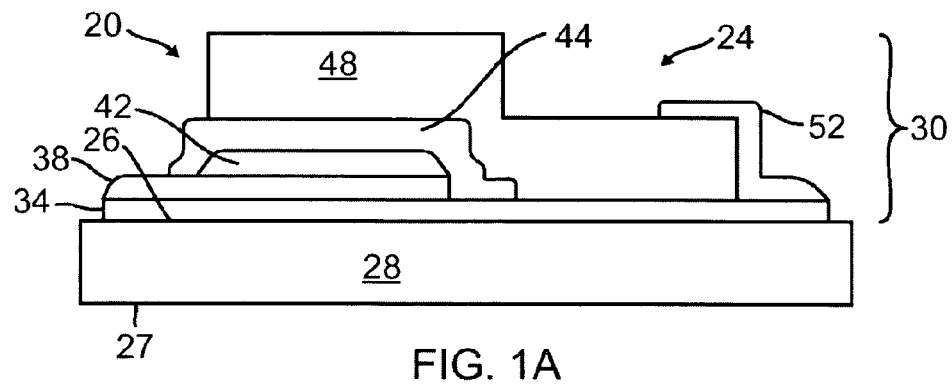
FIG. 1A is a schematic sectional side view of an embodiment of a thin film battery formed on a planar surface of a substrate.

An embodiment of a thin film battery 20 comprises one or more battery cells 24 on a planar surface 26 of a substrate 28, is for example, illustrated in FIG. 1A. A battery cell 24 comprises a plurality of battery component films 30 that cooperate to form a battery which can receive and store, or discharge electrical energy. The battery component films 30 include a variety of films which can be employed in a number of different arrangements, shapes and sizes. For example, the battery component films 30 can include at least a pair of electrodes, such as an anode, cathode, and/or current collector films, and an electrolyte film between the electrodes, and may also include other underlying films, such as adhesion films, and overlying protective films or packaging.

In one embodiment of the battery 20, the battery component films 30 include an adhesion film 34 which is used to improve the adhesion of overlying films. A first current collector film 38, which may serve as the cathode current collector, is formed on the adhesion film 34 as shown in FIG. 1A. A cathode film 42 comprising an electrochemically active material is then formed over the current collector film 38. An electrolyte film 44 is formed over the cathode film 42, and an anode film 48 formed over the electrolyte film 44. A second current collector film 52, which serves as an anode current collector, is formed on the anode film 48. Protective films (not shown) can also be formed on the battery cell 24 to provide additional protection from environmental elements.

Figure 1B:
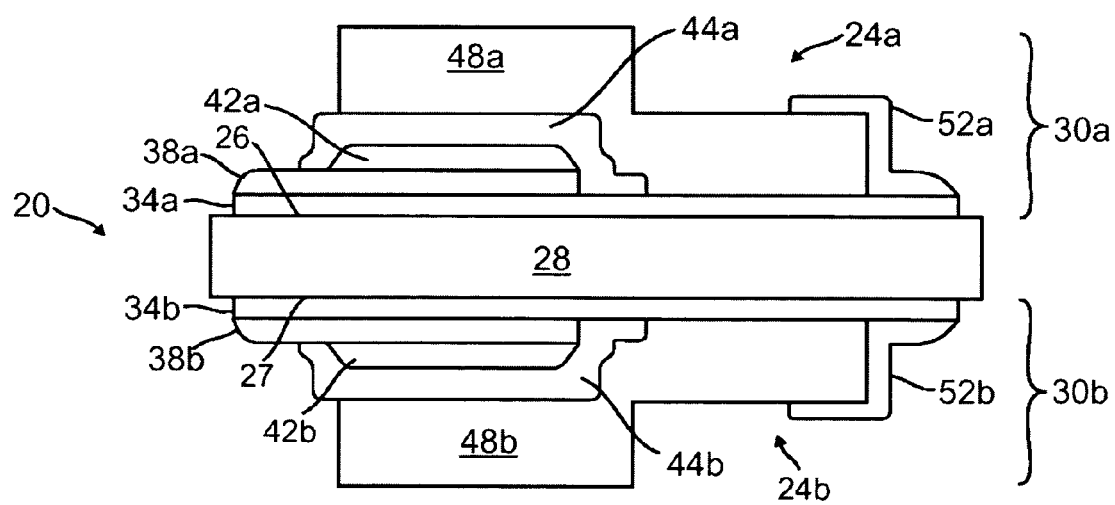
FIG. 1B is a schematic sectional side view of an embodiment of a battery showing battery cells formed on opposing surfaces of the substrate.

The battery 20 can also have multiple battery cells 24 on the same surface and/or on opposing surfaces. For example, a first battery cell 24a on a first planar surface 26 of the substrate 28, and a second battery cell 24b on a second planar surface 27 of the same substrate 28, is illustrated in FIG. 1B. Each battery cell 24a,b comprises a plurality of battery component films 30a,b that include adhesion films 34a,b; first or cathode current collector films 38a,b; cathode films 42a,b; electrolyte films 44a,b; anode films 48a,b; and second or anode current collector films 52a,b. This version of the battery 20 with two opposing cells 24a,b can be formed using the same processes used to form the battery 20 with the single cell 24 (FIG. 1A), by flipping over the substrate 28 to form the battery film components 30b of the second battery cell 24b, during or after processing of the first battery cell 30a. Alternatively, the battery film components 30b of the second battery cell 24b can be formed simultaneously with the battery film components 30a of cell 24a, using chambers having multiple process zones as described below.

The exemplary versions of the battery 20 illustrated herein are provided to demonstrate features of a battery and to illustrate their processes of fabrication; however, it should be understood that the exemplary battery structures should not be used to limit the scope of the invention, and alternative battery structures as would be apparent to those of ordinary skill in the art are within the scope of the present invention. For example, the electrode films which include the current collector films, cathode films, and anode films are inter-replaceable. For example, the battery 20 can include either a pair of anode/cathode films or a pair of current collector films, both the anode/cathode films and the current collector films, or various combinations of these films, such as a cathode film and an anode and anode current collector film.

Figures 2, 6:
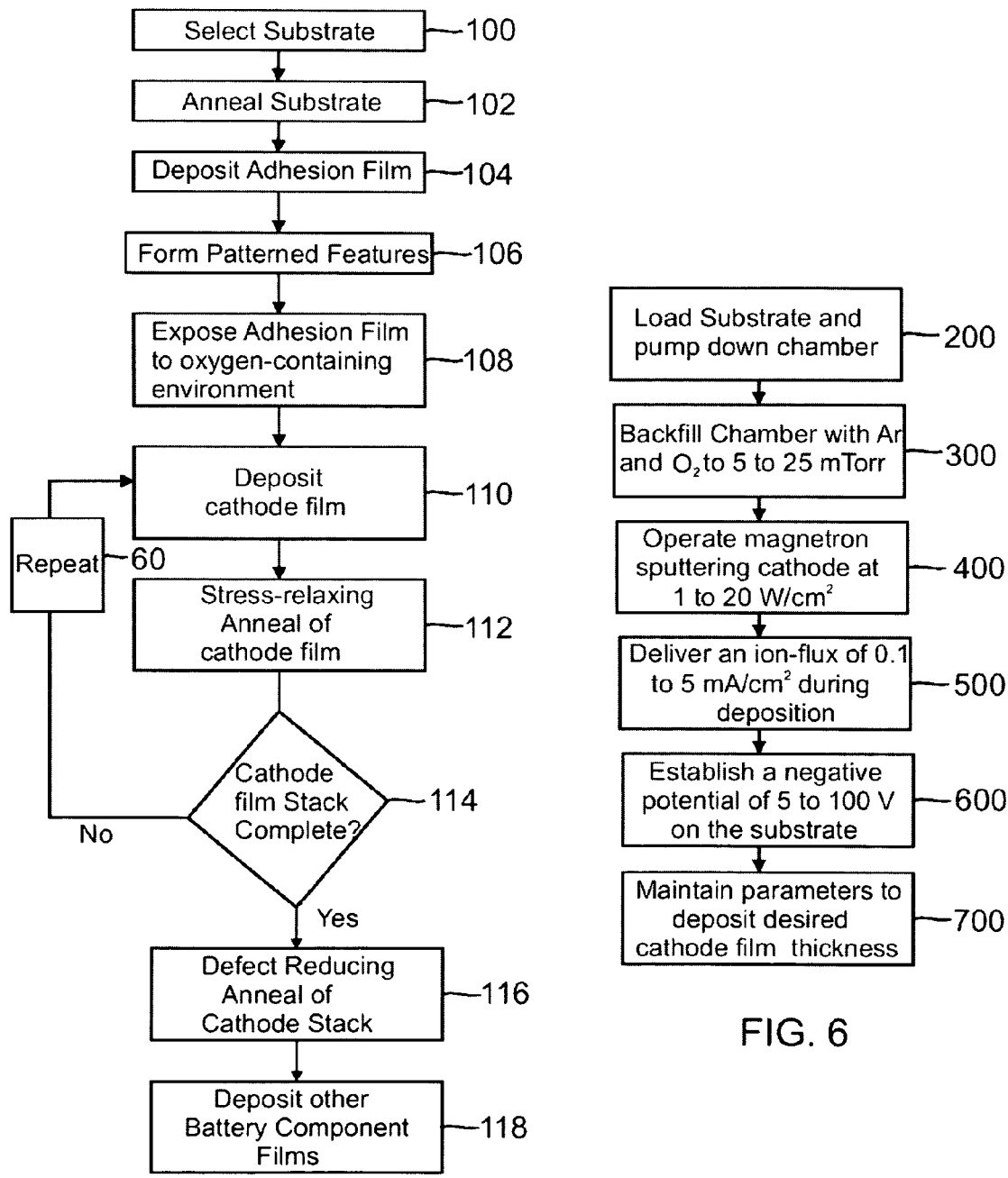
FIG. 2 is a flowchart of an embodiment of a process for fabricating a battery, showing substrate annealing, adhesion film deposition and partial oxidation, and depositing and annealing of a stack of cathode films.
FIG. 6 is a process flowchart showing an embodiment of a sputtering process for depositing a cathode film.

An embodiment of a method of fabricating a battery 20 or batteries having other designs as would be apparent to those of ordinary skill in the art, is illustrated in the flowchart of FIG. 2. In an initial step 100, a substrate 28 is selected which has desirable surface properties and strength requirements. The substrate 28 can be an insulator, semiconductor, or conductor, and should have sufficient mechanical strength to support the battery component films 30 during processing and operation, and good surface polish and dielectric properties. Suitable substrates 28 can be composed of, for example, ceramic oxides such as aluminum oxide or silicon dioxide; metals such as titanium and stainless steel; semiconductors such as silicon; or even polymers.

In one embodiment, which may be used by itself, or in combination with any of the other features or methods described herein, the substrate 28 comprises a sheet of mica. Mica substrate reduces the total weight and volume of the battery while providing sufficient strength to provide the desired mechanical support for the battery 20. The mica substrate typically has a thickness of less than about 100 microns, or even less than about 25 microns. Mica is a muscovite material, which is a layered silicate with a typical stoichiometry of $KAl_3Si_3O_{10}(OH)_2$. Mica has a flat six-sided monoclinical crystalline structure with cleavage properties that allow mica to be split into thin foils along its cleavage planes to provide thin substrates having large smooth surfaces 26 that are suitable to receive thin films. Chemically, mica is stable and inert to the action of most acids, water, alkalies and common solvents. Electrically, mica has good dielectric strength, a uniform dielectric constant, and low electrical power loss factors. Mica is also stable at high temperatures of up to 650° C. By using mica, thin substrates may be fabricated to provide lighter and smaller batteries with relatively higher energy density levels. Mica also provides good physical and chemical characteristics for processing of the thin films formed on the substrate, in a CVD or PVD chamber, such as for example, a magnetron sputtering chamber.

In one version, the selected substrate 28 is processed through a substrate annealing process to clean the substrate surface, as shown in step 102 in FIG. 2, by heating it to temperatures sufficiently high to burn-off contaminants and impurities, such as organic materials, water, dust, and other materials formed or deposited on the planar surfaces 26, 27 of the substrate 28. Such impurities are undesirable because they can cause defects to be formed in the crystalline and other films subsequently deposited on the surfaces 26, 27 of the substrate 28. In one example of such an annealing process step, the substrate 28 is annealed to a temperature of from about 150 to about 600° C. For example, the substrate 28 can be annealed to a temperature of at least about 200° C., or even at least about 400° C. The annealing process can be conducted in an oxygen-containing gas, such as oxygen or air, or other gas environments. The oxygen-containing gases burn off the organic materials and contaminants on the substrate 28. The annealing process can also be conducted for about 10 to about 120 minutes, for example, about 60 minutes.

Figure 3:
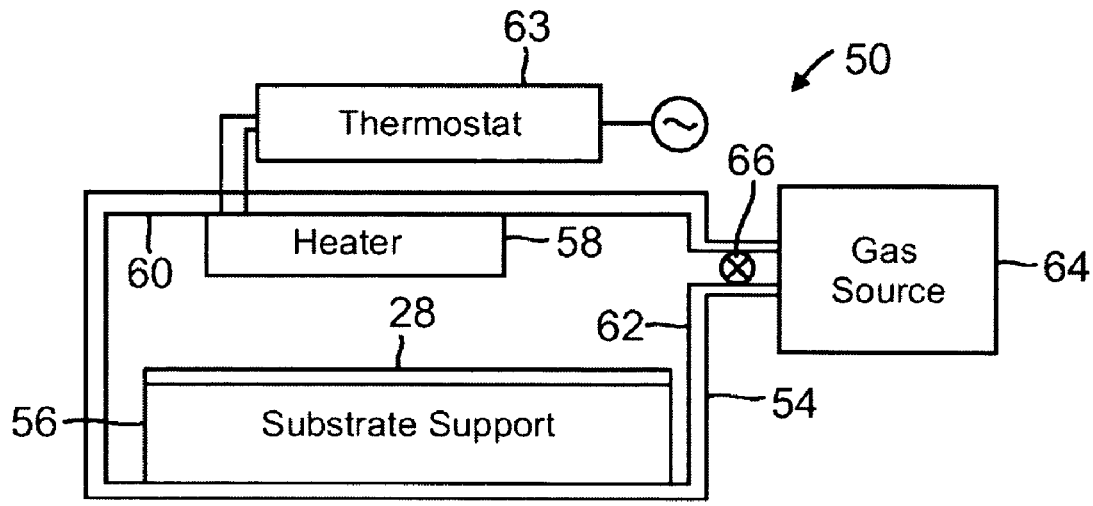
FIG. 3 is a schematic sectional view of an annealing furnace suitable for heating a substrate, single cathode film, stack of cathode films, adhesion film, or any combination of the same.

The annealing step 102 can be conducted in a furnace 50 as illustrated in FIG. 3. The furnace 50 comprises an enclosure 54 having a substrate support 56 to support the substrate 20. A heater 58 is provided to heat the substrate 20 on the substrate support 56. For example, the heater 58 can be radiant heat lamps mounted on a ceiling 60 of the chamber (as shown), or can be resistive heating elements, such as Nichrome™ or molybdenum elements mounted on a sidewall 62 of the chamber (not shown). The resistive heating elements can also be placed in or around the substrate support 56. The heater 58 can be controlled by a thermostat 63 and powered by AC line voltage. Optionally, a gas source 64 can be used to provide a gas to the annealing furnace 50, such as purified air or oxygen. The gas flow rate can be controlled using a gas flow control valve 66. The furnace 50 can also have various exhaust ports (not shown) or other features. A suitable furnace 50 comprises a Lindberg convection oven fabricated by Thermo Fisher Scientific, USA.

For certain substrate materials, it is believed that the substrate cleaning annealing step also removes any water of crystallization which is present within the substrate structure. For example, heat treatment of a mica substrate at temperatures of at least about 540° C. is believed to remove water of crystallization present in the mica microstructure. Removal of the water of crystallization significantly improves adhesion of overlying films to the mica substrate. It is believed that this occurs because residual water of crystallization vaporizes in the microstructure in subsequent fabrication steps in which the substrate is heated, and arises to the surfaces 26, 27 of the substrate 28 to cause delamination of the overlying film. For example, it was found that annealing a substrate 28 comprising mica at temperatures of about 560° C. provided significant improvements in the yields of thin film batteries formed on the substrate, particularly when thicker cathode films 42 were subsequently employed in the battery 20. For example, an annealing temperature of 200° C. for a mica substrate upon which a cathode film 42 having a thickness of 5 microns was deposited, resulted in less than 10% of the cathode films on a batch of such substrates peeling off from the substrates 28. However, when a cathode film 42 having a thickness of 10 microns was deposited on the substrate 28 and annealed to a temperature of 200° C., greater than 70% of the cathode films were found to peel off the substrate 28. When the substrate annealing temperature was increased to 560° C. or higher, less than 30% of the cathode films 42 peeled off the substrate 28. It is believed that the more than twofold increase in battery yields at the higher annealing temperature resulted from removal of the water of crystallization present in the mica substrate.

The substrate cleaning and annealing step 102 can also include or optionally only be directed to, a plasma cleaning step which is conducted to clean the surfaces 26, 27 of the substrate 28 as the only cleaning step or in combination with other heat treatment cleaning steps. In this step, a substrate 28 is placed in a plasma chamber (such as the chamber shown in FIG. 7A) and a plasma of a cleaning gas is formed to clean the surface of the substrate 28. A suitable cleaning gas can include an oxygen containing gas, for example, air or oxygen. The plasma can be formed by applying electrical energy to a pair of electrodes in the chamber, for example RF energy at a frequency of 13.5 MHz. The power level applied to the electrodes in a plasma chamber having a diameter of about 13 cm and the length of about 50 cm, can be for example, from about 200 to about 1000 Watts, or even about 500 Watts. The electrical power level applied to electrodes (such as the structures 180, 185 in the chamber 150) is dependent on the size of the plasma chamber and would be adjusted in different size chambers to provide equivalent Watt/volume power levels as would be apparent to one of ordinary skill in the art. The resultant plasma etches the surface layer of the substrate 28 and also burns off and removes the organic contaminants and impurities from the substrate.

After the substrate cleaning and annealing step, a plurality of battery component films 30 are deposited on the surfaces 26, 27 of the substrate 28 in a series of process steps to form battery cells 24 of a battery 20 that can generate or store electrical charge. While a particular sequence of process steps is described to illustrate an embodiment of the process, it should be understood that other sequences of process steps can also be used as would be apparent to one of ordinary skill in the art.

In one version, an adhesion film 34 is initially deposited on the planar surface 26 of the substrate 28 to improve adhesion of overlying battery component films 30 formed on the substrate 28, as illustrated by step 104 of FIG. 2. The adhesion film 34 can comprise a metal or metal compound, such as for example, aluminum, cobalt, titanium, other metals, or their alloys or compounds thereof; or a ceramic oxide such as, for example, lithium cobalt oxide. Generally, the adhesion film 34 is deposited to cover only the surface area of the substrate 28 that lies immediately below the battery component films 30 so that the overlying films are more firmly adhered to the substrate 28. The other surface regions of the substrate 28 are left exposed without coating with the adhesion film 34 as the adhesion film 34 is a metal conductor and could cause short circuiting of the battery films. When the adhesion film 34 is fabricated from titanium, the titanium film is deposited in a sputtering chamber with, for example, the following process conditions: argon maintained at a pressure of 2 mTorr; DC (direct current) sputtering plasma at a power level of 1 kW, a deposition time 30 seconds, a titanium target size of 5×20 inches, and a target to substrate distance of 10 cm. In the version shown in FIG. 1B, after deposition of a first adhesion film 34a on the first planar surface 26 of the substrate 28, the substrate 28 is flipped over and a second adhesion film 34b is deposited on the second planar surface 27 which forms other side of the substrate. In this version, both sides or opposing planar surfaces 26, 27 are coated with an adhesion films 34a,b as shown in FIG. 1B. This double deposition can be done in sequence, or simultaneously in a multiple process zone chamber.

Figure 4:
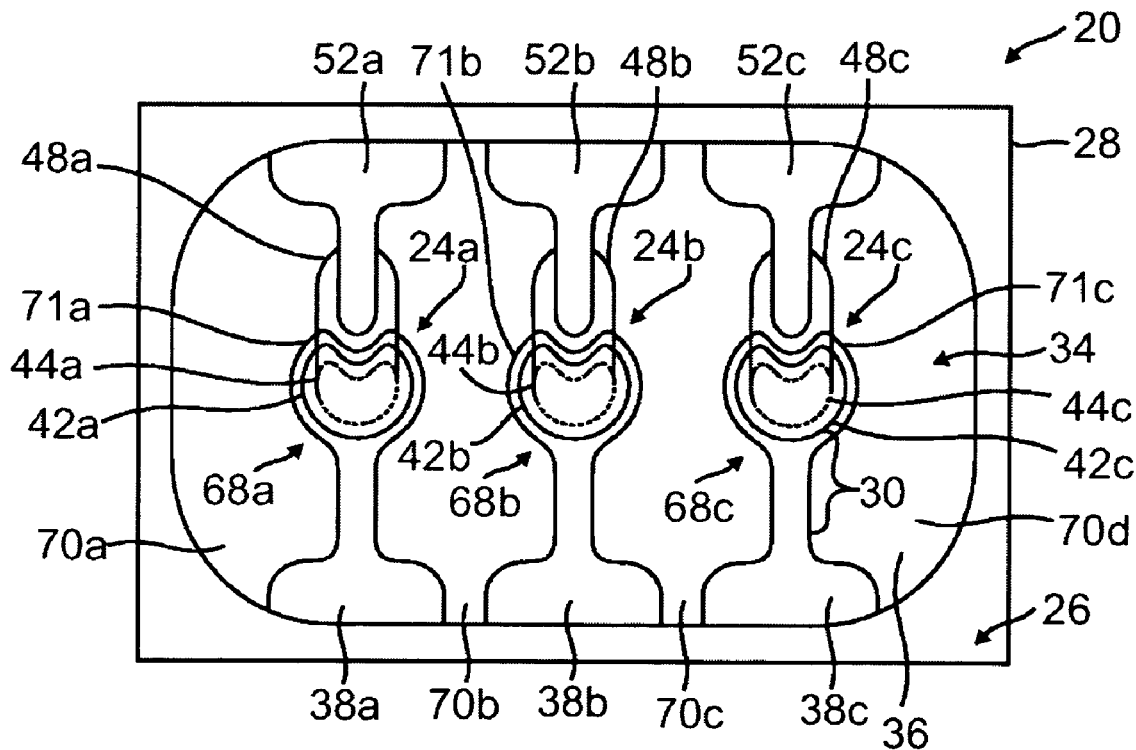
FIG. 4 is a schematic top view of an embodiment of a thin film battery showing an adhesion film with oxygen-exposed regions and covered regions, and other battery component films over the adhesion film.

In one version of the battery 20, the adhesion film 34 is deposited on the substrate 28 not only to cover the area under the subsequently deposited battery cells 24a-c and their battery component films 30 but also the area 36 extending beyond the battery component films 30, as illustrated in FIG. 4. Thus, the adhesion film 34 is deposited below, around, and in-between the battery cells 24a-c. This is in contrast to prior art batteries where the adhesion film 34 was only formed directly below the cells themselves but not around the cells 24a,b. In one version, this adhesion film 34 is deposited in a thickness of from about 100 to about 1500 angstroms, for example, about 500 angstroms. In one further version, the adhesion film 34 covers a large portion of the substrate 28, for example, at least about 60%, or even at least about 70%, of the exposed planar area of the substrate 28. The adhesion film 34 can even be deposited to cover almost the whole surface of the substrate 28. However, the area depends on the desired size of the substrate 28 and the size and number of overlying battery cells 24.

After deposition of the adhesion film 34, a battery component film 30 such as for example, a first current collector film 38 (which can serve as a cathode current collector film) is deposited on top of the adhesion film 34. The current collector film 38 is typically a conductor and can be composed of a metal, such as aluminum, platinum, silver or gold. A noble metal is desirable because it does not readily oxidized when heated in an oxygen containing environment in subsequent annealing steps, and platinum is a good choice. A suitable thickness for the first current collector film 38 is from about 0.05 microns to about 2 microns. The current collector film 38 serves to collect the electrons during charge and discharge process. The current collector film 38 may also comprise the same metal as the adhesion film 34 provided in a thickness that is sufficiently high to provide the desired electrical conductivity. In one example, the first current collector film 38 comprises platinum in a thickness of about 0.2 microns.

In the version shown in FIG. 4, a plurality of first current collector films 38*a-c* is formed as a pattern comprising one or more features 68*a-c* that each comprise a spaced apart discontinuous region that covers a small region of the adhesion film 34 as per step 106. The features 68*a-c* are over the covered regions 71*a-d* of the adhesion film 34, and adjacent to the features 68*a-c* are exposed regions 70*a-d* of the adhesion film 34. In one version, the features 68*a-c* form covered regions 71*a-d* of the adhesion film 34 that cover at least about 20% of the entire area of the adhesion film 34. To deposit the patterned film 38*a-c*, a patterned mechanical mask is placed on top of the substrate 28, and a first current collector film 38 of platinum is deposited by DC magnetron sputtering to form the features 68*a-c* in between the patterned mask regions. The sputtering conditions for the deposition of a suitable platinum film are argon at a pressure of 5 mTorr, and a sputtering DC plasma formed at a power level of 40 W for 10 minutes.

After forming the features 68*a-c* on the adhesion film 34, the adhesion film with its covered regions 71*a-c* below the patterned features 68*a-c* and exposed surface regions 70*a-d*, is then exposed to an oxygen-containing environment and heated as per step 108 of FIG. 2. The oxygen exposure and heating step is performed to oxidize the exposed regions of the titanium film that surround the deposited platinum features but not those regions covered and protected by the platinum features. This process may be carried out within the titanium or platinum sputtering chamber or within a separate annealing chamber as previously described. For example, during this step, the adhesion film 34 can be heated in air or other oxygen-containing environments to temperatures of from about 200° C. to about 600° C., for example, about 400° C., for about an hour.

It is believed that the oxygen exposed titanium adhesion film comprises both conductive elemental titanium regions underneath battery component films 30 and an electrically insulative or dielectric film that surrounds the battery component films. In the oxygen-containing gas exposure step, the exposed regions 70*a-d* of the adhesion film 38 that lie inbetween the features 68*a-c* form oxygen-exposed regions and those under the features remain as the covered regions 71*a-d*. The exposed regions 70*a-d* of the adhesion film 34 that lie between the covered regions 71*a-c* form oxidized regions that are composed of an oxide material which is non-conducting and a dielectric. For example, when the adhesion film 34 comprises a metal, such as titanium, the oxygen-exposed or oxidized regions comprise a metal oxide such as titanium oxide. The oxidation temperature should be sufficiently high to oxidize the exposed regions of the adhesion film 34 but not so high as to oxidize the current collector film 38 itself. The resultant structure, advantageously, provides not only the non-exposed covered regions 71*a-c* of adhesion film 34 below the features 68*a-c* of the current collector film 38 but also oxygen-exposed or oxidized regions 70*a-d* which form non-conducting regions that electrically separate the plurality of battery cells 24*a-c* formed on the same substrate 28. The covered regions 71 *a-c* can be non-oxidized regions, can remain as elemental metal, or can form diffusion regions. It should be noted that the oxygen-exposure step can also be delayed to overlap with a subsequently performed annealing step, such as annealing of the cathode film, so that the oxygen exposure of the adhesion film 34 occurs simultaneously with annealing of another subsequently deposited film.

Thereafter, a cathode film 42 comprising an electrochemically active material is then deposited over the patterned current collector film 38 as per step 110. In one version, the cathode film 42 is composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of cathode films 42 that may be used comprise amorphous vanadium pentoxide, crystalline $V_2O_5$ or $TiS_2$.

Figure 5A:
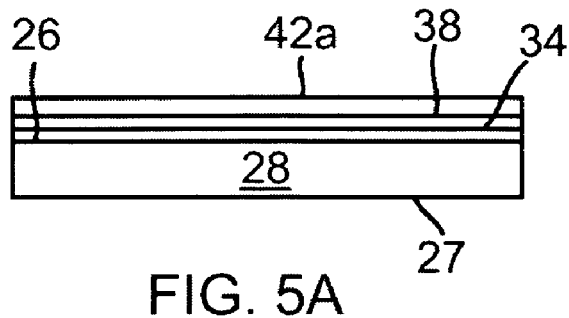
FIGS. 5A to 5C are schematic sectional side views of a partially fabricated battery showing the process sequence for the deposition of a stack of cathode films with intermediate annealing steps.
Figure 5B:
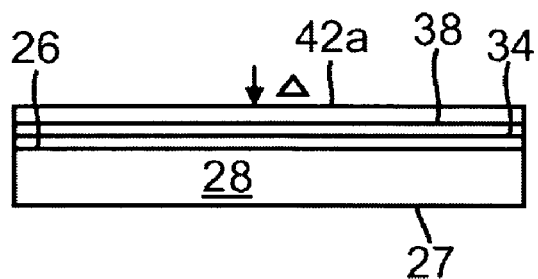
Figure 5C:
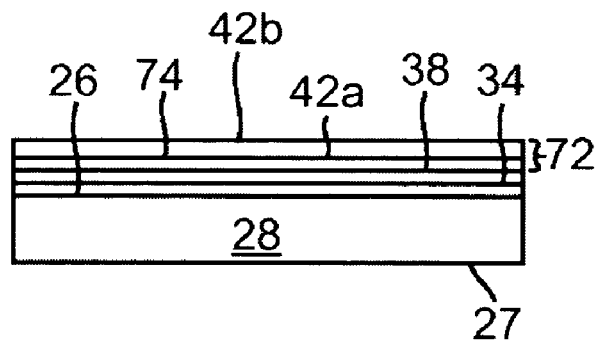

In one exemplary embodiment, which also may be used by itself, or in combination with any of the other features and methods described herein, a cathode film 42*a* is deposited (step 110 of FIG. 2) over an adhesion film 34 and a first current collector film 38 which are already formed on the substrate, then a stress reducing anneal (step 112) is performed on the cathode film 42*a*, and these deposition and stress reducing annealing steps are repeated (step 114) to form a stack 72 comprising a sequence of cathode films 42*a,b*, as shown in FIGS. 5A to 5C.

After a first sputter deposition step to deposit a first cathode film 42*a* on the substrate 28 as shown in FIG. 5A, the as-deposited cathode film 42*a* is heated in a stress reducing annealing step (step 112 of FIG. 2) as shown in FIG. 5B to a first temperature of from about 200 to about 500° C. The stress reducing annealing process can be performed in a sputtering chamber or in a separate annealing furnace. When performed in the sputtering chamber, the sputtering gases in the chamber are fully exhausted, and a non-reactive gas is introduced into the chamber. Thereafter, a heater in the chamber is electrically powered to heat the substrate 28 to the desired temperature. Alternatively, the substrate 28 having the as-deposited cathode film 42*a* is heated in a separate furnace 50 as shown in FIG. 3, such as the previously referenced Lindberg oven. During annealing in the annealing chamber, the substrate 28 is placed on a support 56 of the furnace 50, and a gas comprising air, or oxygen, is introduced into the furnace. The furnace 50 is then heated using the heaters 52 to the desired temperature.

The sputter deposition step is then repeated to form a second cathode film 42*b* which is directly over and superimposed on the first cathode film 42*a*, as shown in FIG. 5C. The first and second cathode films 42*a,b* are in direct contact with one another at the interface 74. The resultant stack 72 of cathode films 42*b* on the surface of the substrate (formed per steps 58 and 60 in FIG. 2) builds up the thickness of the cathode film 42. The sputter deposition and stress reducing annealing steps may be repeated a number of times until the desired thickness of a stack 72 of cathode films 42*a,b* is obtained. For example, the deposition and annealing steps can be repeated at least once, or even repeated two or three times. The resultant stack 72 of superimposed cathode films 42*a,b* comprises a total thickness which is much larger than the thickness of each individual cathode film 42*a,b*. For example, if the first cathode film 42*a* is deposited with thickness of 5 microns, then annealed, and then a second cathode film 42*b* of another 5 microns is deposited, followed by another annealing step, the resultant stack of cathode films 42*a,b* will be about 10 microns thick. Typically, a stack 72 of cathode films 42*a,b* has a thickness of at least about 5 microns, or even at least about 10 microns. It is believed that the successive deposition and stress reducing annealing process reduces the stresses in the deposited cathode film stack 72 by stress relaxing mechanisms, such as rearranging point defects. The process can then be repeated by flipping the substrate 28 over and performing a second sequence of cathode film deposition and annealing steps to form a second stacked cathode film on the other surface of the substrate 28.

The stacks 72 of cathode films 42a,b formed on the substrate 28 are then further annealed in a defect reducing annealing step 116, as shown in FIG. 2, to a second higher temperature to reduce defects in the cathode film and increase crystallization in the film. For example, the defect reducing annealing temperature can be from about 150 to about 700° C. In one embodiment, the temperature is about 540° C. This annealing process is conducted to further improve the quality of the cathode films 42a,b in the stack 72 by reducing the amount of defects present in the cathode films 42a,b, such defects including lattice point defects. The defect reducing annealing step was found to increase the battery energy capacity by 10 to 20%, increase the charge and discharge current by more than 50%, and improve the resistance to moisture. These attributes arise from the elimination of point defects and the reduction of electrical contact resistances in the cathode material.

An exemplary process for sputter depositing a stack 72 comprising a plurality of cathode films 42a,b by successive deposition steps will now be described. While a process for depositing an exemplary cathode stack as described, it should be understood that such a process can be used for other cathode materials as would be apparent to those of ordinary skill in the art. In the illustrative example, the cathode film material comprises crystalline lithium cobalt oxide, which in one version, has the stoichiometric formula of $LiCoO_2$. The crystalline lithium cobalt oxide film is fabricated using the multiple sequential deposition and stress reducing annealing step. Advantageously, such a process allows deposition of a thicker cathode stack 72 which has less residual stresses, and ultimately lower levels of point defects, to provide a battery 20 having a higher energy density.

Figure 7A:
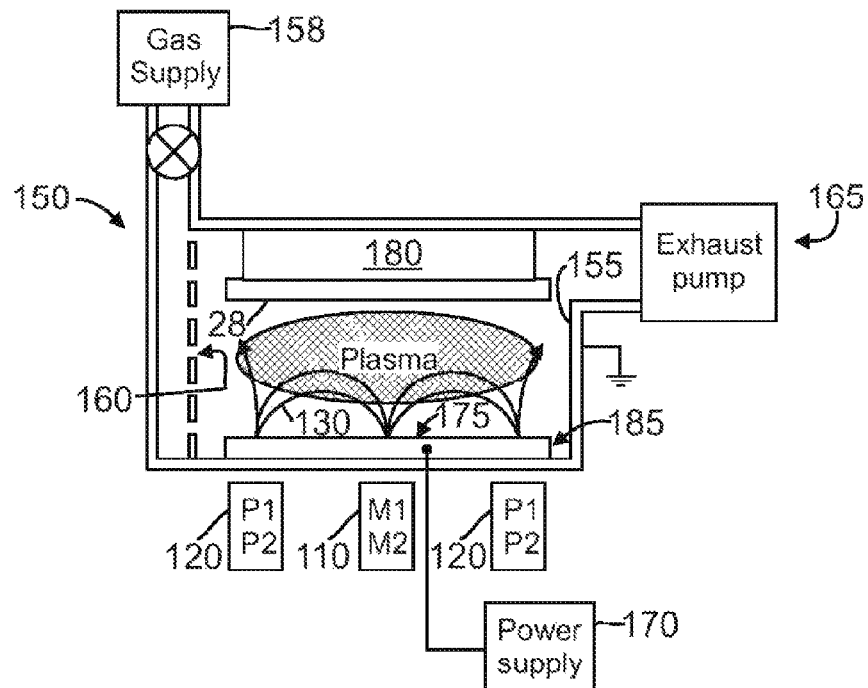
FIG. 7A is a schematic sectional side view of a magnetron PVD chamber comprising a single process zone that is suitable for depositing a cathode film on a surface of a substrate.

A first cathode film 42a comprising lithium cobalt oxide is deposited on a substrate 28 (FIG. 5A) using a sputter deposition process, an exemplary version of which is summarized in FIG. 6. Generally, the process steps include pumping down a chamber and loading a substrate 28 into a chamber (step 200) that is ready for deposition of a lithium cobalt oxide film 42. An exemplary version of a typical magnetron PVD chamber 150 suitable for depositing material by sputtering is illustrated in FIG. 7A. The chamber 150 comprises walls 155, a gas supply 158 connected to a gas distributor 160, a gas exhaust 165, and a power supply 170 to apply a power to a target 175. Initially, the chamber 150 is vacuum pumped down to a pressure of about $1 \times 10^{-5}$ Torr to remove gases, and a substrate 28 comprising single mica sheet (or a plurality of mica sheets) is transported by a substrate holder 180 into the chamber 150 by a conveyor (not shown) and positioned facing the target 175. The substrate holder 180 is electrically isolated from the chamber walls 155 which are typically electrically grounded. The process chamber 150 is separated from a loading chamber (not shown) by a slit valve (also not shown). The process chamber 150 typically comprises a volume of about $0.5 \text{ m}^3$ and the sputtering target 175 is typically sized about 5"×25". A process gas distributor 160 is provided for distributing a process gas into the chamber 150, such as for example, argon and oxygen, at a flow rate ratio of $Ar/O_2$ of from about 1 to about 45, to serve as the sputtering gas as shown in Step 300. The sputtering gas is maintained in the chamber 150 at a pressure of from about 5 to about 25 mTorr.

A high density plasma is generated in the chamber 150 by a magnetron sputtering cathode 185, as in step 400. The plasma is formed over an area that is sufficiently large to coat the entire substrate 28, for example, an area of about 8"×about 25". In one version, the magnetron cathode 185 comprises central magnets 110 (denoted by M1 and M2) that provide a weaker magnetic field than the surrounding peripheral magnets 120 (denoted by P1 and P2). Both the peripheral and central magnets 110, 120 have a polarity of south facing the chamber 150 and north facing away from the chamber 150. In this configuration, the magnetic field 130 generated by the magnets 120 is not confined to near the magnetron cathode surface 185. Instead, the magnetic field lines 130 extend to near the substrate 28. Secondary electrons follow the magnetic field lines near the surface of the substrate 28 to create a high-density plasma in this area. In one version, the magnets 120 are arranged about a perimeter of the target 175. Thus, the distribution of plasma ions about the substrate 28 may be controlled with the magnetic field 130.

A sputtering target 175 comprising lithium cobalt oxide is provided in the chamber 150 to sputter deposit a cathode film 42a of lithium cobalt oxide on the substrate 28. The magnetron-sputtering cathode 185 is operated at a power density level of from about 0.1 to about 20 $W/cm^2$ as per step 400. In conjunction with operating the cathode 185, an ion flux of from about 0.1 to about 5 $mA/cm^2$ is delivered to the substrate 28 during deposition of the lithium cobalt oxide film on the substrate as in step 500. During deposition, a negative potential of 5 to 100 V on the substrate 28 is established with respect to the plasma as in step 600. The potential can be established either by using an external power supply or by electrically floating the substrate holding holder 180. The parameters of the deposition process are maintained until the desired film thickness is reached as per step 700. The temperature of the substrate 28 during the deposition process is estimated to be from about 100 to about 200° C.

Figure 8:
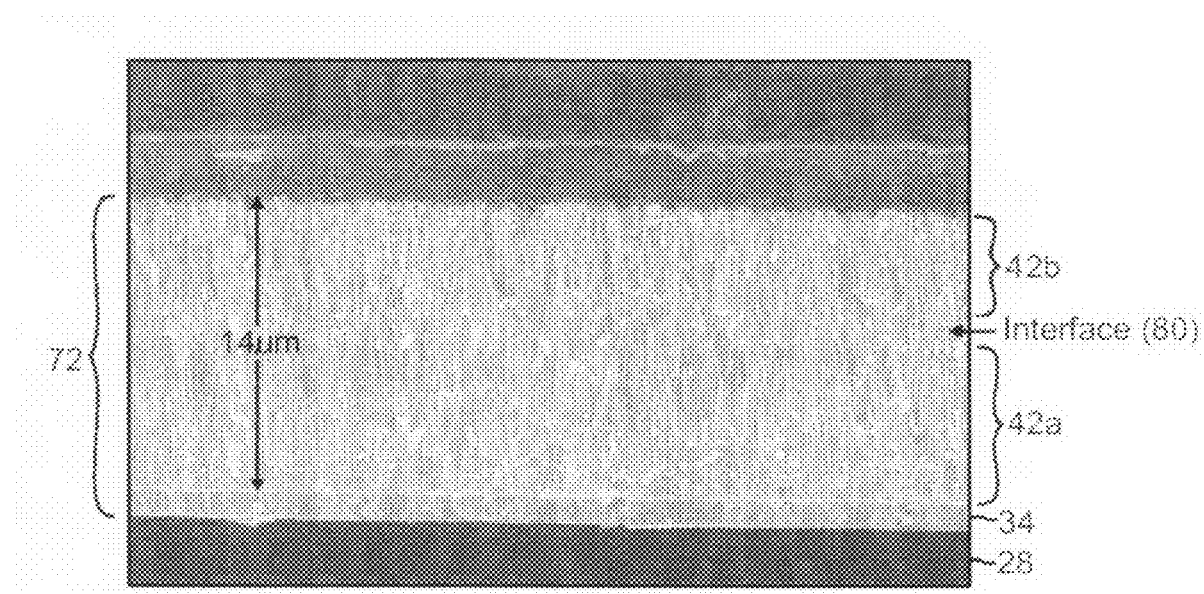
FIG. 8 is an SEM micrograph of an as-deposited stack of cathode films comprising two lithium cobalt oxide films showing the interface between the films.

The sputter deposition process is conducted for a sufficient time to deposit a cathode film 42a having a thickness of from about 0.25 to about 0.75 of the total thickness of the final stack 72 of cathode films 42a,b. After the sputter deposition step, the as-deposited cathode film 42a is annealed to a first temperature of from about 200 to about 500° C. This annealing process can be performed in the same sputtering chamber or in an annealing furnace as previously described. The sputter deposition and annealing steps are repeated to form a stack of the cathode films on the surface of the substrate 28. The stack 72 of cathode films 42a,b formed on the substrate 28 is further annealed in a defect reducing annealing step to a second temperature of from about 150 to about 700° C. This annealing process is conducted to further improve the quality of the stack 72 of lithium cobalt oxide films by reducing point defects and other lattice defects in the film stack. An SEM micrograph of an as-deposited stack 72 of two lithium cobalt oxide films 42a,b is shown in FIG. 8, along with the current collector, electrolyte, and anode films. It is seen that the interface 80 between the cathode films 42a and 42b is visible as a thin line without extensive cracking or defects. This demonstrates that the stack 72 of multiple cathode films 42a,b forms to form an unitary structure that serves as a single stack without apparent deleterious effects.

Figure 5D:
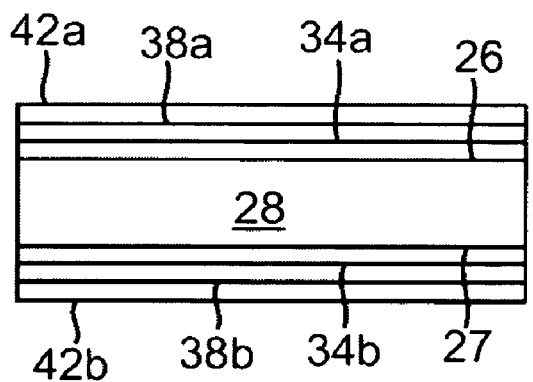
FIG. 5D is a schematic sectional side view of a partially fabricated battery showing the deposition of cathode films on opposing first and second surfaces of the substrate to form multiple cathode stacks on either side of the battery.

In another version, as illustrated in FIG. 5D, after deposition of a single layer of a first cathode film 42a over the adhesion film 34a and current collector 38a on the planar surface 26 of the substrate 28, the substrate 28 is flipped over, and a single layer of second cathode film 42b is deposited over the already deposited adhesion film 34b and current collector 38b on the opposing surface 27 of the substrate 28. The process is then repeated to alternately deposit additional layers of cathode film 42 on either side of the substrate 28 to build-up a stack of cathode films on each side of the substrate 28. The alternate deposition process is advantageous as it reduces stresses that would otherwise arise if the layers of cathode films were formed only one surface 26 on one side of the substrate, and then formed on the opposing surface 27 on the other side.

Figure 7B:
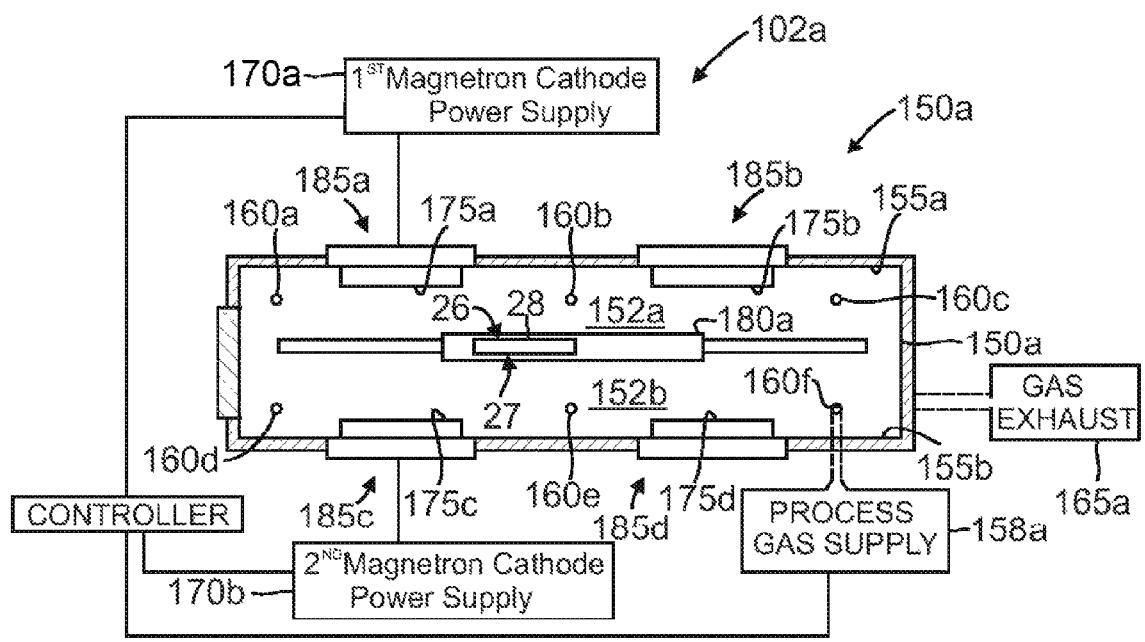
FIG. 7B is a schematic sectional top view of a magnetron PVD chamber comprising multiple process zones that can simultaneously deposit material on opposing planar surfaces of one or more substrates.

The twin cathode films 42a,b can also be formed simultaneously on both surfaces 26, 27 of one or more substrates 28 in an apparatus 102a comprising a rectangular chamber 150a having dual process zones 152a,b, as illustrated in FIG. 7B. In this chamber, a first pair of targets 175a,b is mounted on a first wall 155a, and a second pair of targets 175c,d is mounted on a facing and opposing second wall 155b. A gas supply 158a is connected to a gas distributor 160a-f to provide process gas to the chamber. A gas exhaust 165a maintains the process gas at a desired pressure in the chamber 150a using a throttle valve or other flow control system. A pair of power supplies 170a,b apply power to the targets 175a-d. A substrate holder 180a is capable of holding one or more substrates 28 by their edges to expose both opposing surfaces 26,27 to face the targets 175a-d in the process zones 152a,b. The substrate holder 180a is electrically isolated from the chamber walls 155a,b which are electrically grounded. A process gas is distributed into the chamber 150a, the process gas comprising, for example, argon and oxygen, at a flow rate ratio of $Ar/O_2$ of from about 1 to about 45, and maintained at a pressure of from about 5 to about 25 mTorr. Two or more plasmas are generated in the chamber 150a by the magnetron sputtering cathodes 185a-d at power levels of from about 200 to about 1000 Watts, to cover the two surfaces 26, 27 of one or more substrates 28 with a sputtered film which is sputtered from the sputtering targets 175a-d. For example, the targets 175a-d can be sputtered to deposit the cathode films 42a,b of lithium cobalt oxide on each of the two planar surfaces 26,27 of the substrate 28 by applying current at a power density level of from about 0.1 to about 20 $W/cm^2$ to the sputtering targets 175a-d while maintaining the substrate at a potential of from about −5 to about −200 V.

Figure 7C:
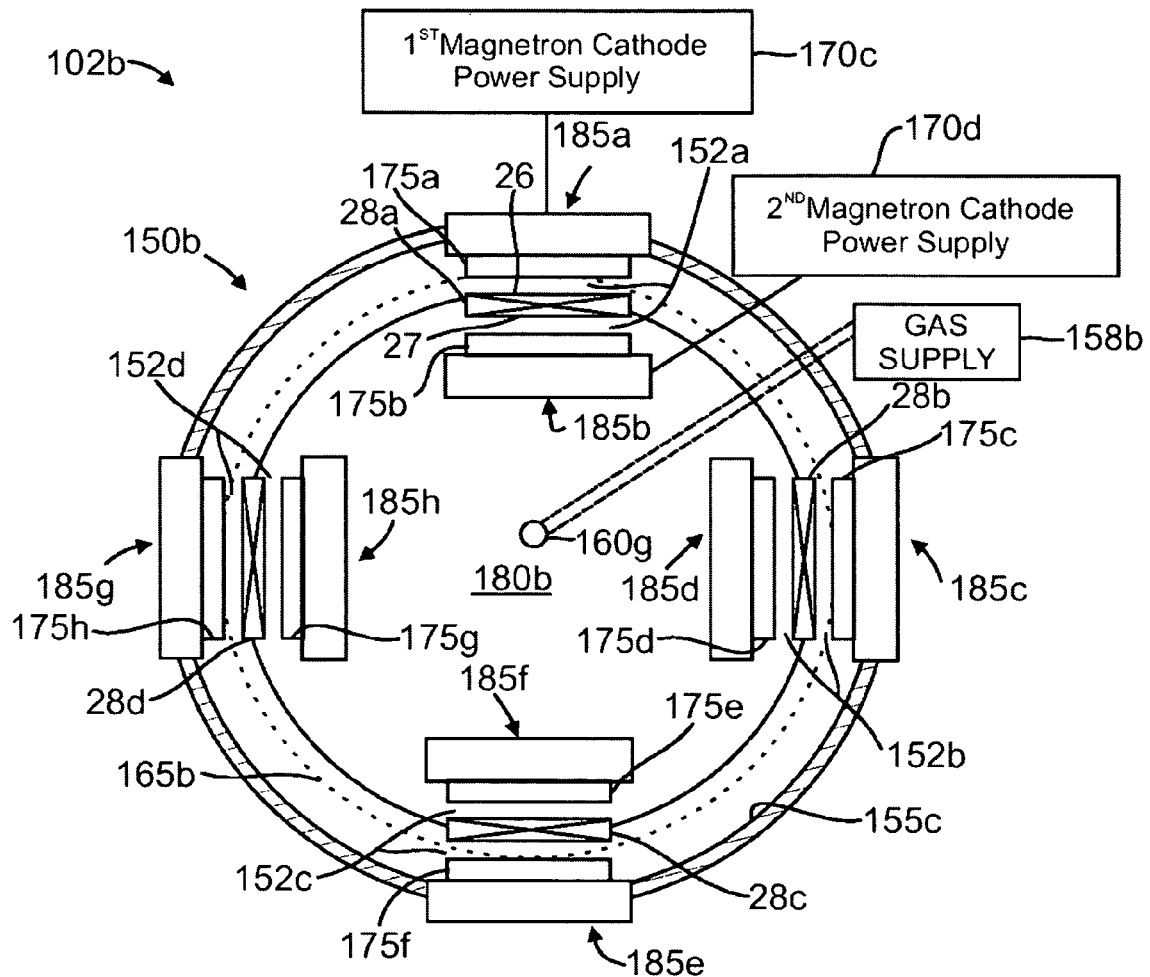
FIG. 7C is a schematic sectional top view of another embodiment of a magnetron PVD chamber comprising a rotary fixture and having multiple process zones for simultaneously depositing material on opposing planar surfaces of one or more substrates.

Multiple substrates 28a-d can also be processed simultaneously in an apparatus 102b comprising a circular chamber 150b having multiple process zones 152a-d for simultaneously depositing material on two opposing planar surfaces 26, 27 of each of the substrates, as shown in FIG. 7C. The chamber 150b comprises a rotary substrate holder 180b capable of holding the substrates 28a-d by their edges to expose the opposing surfaces 26,27 of each of the substrates 28a-d to pairs of the targets 175a-h in the process zones 152a-d. The substrate holder 180a is electrically isolated from the chamber wall 155c which is electrically grounded. In this chamber, a plurality of targets 175a-h are mounted on the circular wall 155c such that pairs of targets 175a,b;175c, d;175e,f; 175g,h, face each other and are mounted at 90 degree separation angles around the wall 155c. A gas supply 158b is connected to a gas distributor 160g to provide process gas to the chamber. A gas exhaust 165b maintains the process gas at a desired pressure in the chamber 150b using a throttle valve or other flow control system. A pair of power supplies 170c,d apply power to the targets 175a-h. A process gas is distributed into the chamber 150c, the process gas comprising, for example, argon and oxygen, at a flow rate ratio of $Ar/O_2$ of from about 1 to about 45, and maintained at a pressure of from about 5 to about 25 mTorr. Multiple plasmas are generated in the chamber 150c by the magnetron sputtering cathodes 185a-h at power levels of from about 200 to about 1000 Watts, to cover the two surfaces 26, 27 of one or more substrates 28a-d with a sputtered film which is sputtered from the sputtering targets 175a-h. For example, the targets 175a-h can be sputtered to deposit the cathode films 42a,b of lithium cobalt oxide on each of the two planar surfaces 26,27 of each of the substrates 28a-d by applying current at a power density level of from about 0.1 to about 20 $W/cm^2$ to the sputtering targets 175a-h while maintaining the substrates at a potential of from about −5 to about −200 V.

The stack 72 of cathode films 42a,b formed by the methods described herein is highly crystalline with a strong (101) preferred orientation and with a small amount of (012) oriented grains. For example, FIG. 9 shows a typical x-ray two theta diffraction pattern of an as-deposited $LiCoO_2$ containing cathode film 42 showing that the film is highly crystalline and with a (101) preferred orientation. The substrate 28 was slightly tilted when taking x-ray diffraction in order to suppress the diffraction peaks from the mica substrate to better reveal the property of the $LiCoO_2$ film. Under lower gas pressure levels of about 5 mTorr, the preferred orientation changes to (012) and (104). The (012) and (104) oriented material can still be used as cathode, however, with smaller energy capacity compared to the (101) oriented material.

Advantageously, the specific energy capacity of the battery 20 comprising three battery cells 24a-c that each have a stack 71 of cathode films 42a-c was found to substantially increase with defect-reduction annealing temperature for annealing the cathode film stack. FIG. 10 is a discharge curve of a battery 20 comprising a mica substrate 28 with a crystalline $LiCoO_2$ cathode film 42 that is annealed in different temperatures ranging from no anneal (as deposited), 300° C., 400° C., 500° C., 600° C., 650° C., and 700° C. This battery 20 had a single battery cell 24 having an area of about 14 $cm^2$ formed on a mica substrate having a thickness of 10 microns. A stack 72 of cathode films 42 comprising crystalline $LiCoO_2$ was deposited on the substrate 28 in a thickness of about 14 microns. The discharge capacity of the battery 20 was about 11 mAh. The energy density and specific energy of this thin film battery, including both the cell and the substrate, is about 1000 Wh/L and 320 Wh/kg, respectively. An energy density of more than 1250 Wh/L and a specific energy of more than 330 Wh/kg was achieved by fabricating battery cells on both the front and backside of a mica substrate 20.

FIG. 10 further demonstrates that the capacity of the battery 20 substantially improved with increasing annealing temperature. For example, an as-deposited cathode film 42 provided a battery capacity of less than 0.04 mAhr, increasing the annealing temperature to 400° C. provided a battery capacity which exceeded 0.07 mAHr. At a cathode film annealing temperature of greater than 650° C., the battery capacity increased to higher than about 0.11 mAHr. At annealing temperatures of 700° C., the battery capacity increased to greater than 0.12 mAHr. This represented an almost fourfold increase in battery capacity obtained by annealing the cathode film 42 on the substrate 28.

After the deposition of the entire battery structure, and variety of different protective layers can be formed over the battery cell structure to provide protection against environmental elements, as would be apparent to those of ordinary skill in the art. Also, the thin film battery can also be fabricated to provide a plurality of battery cells on a single substrate 28. The battery cells can be arranged horizontally across a substrate surface or fabricated on the front and backside of the substrate to substantially increase the energy density and capacity of the battery. Suitable battery configurations and packaging are described in for example, U.S. patent application Ser. No. 11/090,408, filed on Mar. 25, 2005, entitled "THIN FILM BATTERY WITH PROTECTIVE PACKAGING" by Krasnov et al., which is incorporated by reference herein in its entirety.

While illustrative embodiments of the thin film battery are described in the present application, it should be understood that other embodiments are also possible. Also, the packaging assembly of the present invention can be applied to contain and hermetically seal other type of batteries, as would be apparent to those of ordinary skill in the art. Thus, the scope of the claims should not be limited to the illustrative embodiments.

What is claimed is:

1. A method of fabricating a battery on a substrate, the method comprising:
   (a) sputter depositing a cathode film on a substrate;
   (b) annealing the cathode film deposited on the substrate to a first temperature of from about 200 to about 500° C.;
   (c) forming a stack of the cathode films on the substrate by repeating steps (a) and (b);
   (d) annealing the stack of cathode films by heating to a second temperature that is from about 500 to about 700° C., whereby the stack of cathode films exhibits reduced delamination from the surface of the substrate; and
   (e) depositing a plurality of other battery component films on the substrate that cooperate to form a battery, the battery component films comprising at least another electrode film and an electrolyte.

2. A method according to claim 1 wherein the cathode film comprises lithium metal oxide.

3. A method according to claim 2 wherein the lithium metal oxide comprises lithium cobalt oxide, lithium nickel oxide, lithium manganese oxide, lithium iron oxide, or mixtures thereof.

4. A method according to claim 1 wherein the cathode film comprises amorphous vanadium pentoxide, crystalline $V_2O_5$ or $TiS_2$.

5. A method according to claim 1 wherein (a) comprises:
   (1) depositing a first cathode film on a first surface of the substrate;
   (2) flipping the substrate over and depositing a second cathode film on a second surface of the substrate, the second surface opposing the first surface of the substrate.

6. A method according to claim 1 wherein (a) comprises simultaneously depositing a first cathode film on a first surface of the substrate and a second cathode film on a second surface of the substrate, the second surface opposing the first surface.

7. A method according to claim 1 wherein (a) comprises depositing a cathode film in a thickness that is from about 0.25 to about 0.75 times the total thickness of the completed stack of cathode films.

8. A method according to claim 1 wherein (a) comprises sputtering a lithium cobalt oxide target in an energized sputtering gas in a process zone of the process chamber to deposit a cathode film comprising lithium cobalt oxide on the substrate.

9. A method according to claim 8 wherein the process zone is in a process chamber, and step (b) comprises:
   (1) removing the substrate from the process zone of a process chamber used to sputter deposit the cathode film on the substrate;
   (2) placing the substrate in an annealing furnace;
   (3) heating the substrate in the annealing furnace; and
   (4) removing the substrate from the annealing furnace.

10. A method according to claim 1 further comprising the initial steps of forming a substrate comprising mica having a thickness of less than about 100 microns, and heating the substrate in air to a temperature of at least 400° C.

11. A battery manufacturing method comprising:
    (a) sputter depositing a lithium cobalt oxide film on a first surface of a substrate;
    (b) annealing the lithium cobalt oxide film deposited on the first surface of the substrate to a temperature of from about 200 to about 400° C.;
    (c) repeating steps (a) and (b) to form a stack of lithium cobalt oxide films on the first surface of the substrate;
    (d) annealing the stack of lithium cobalt oxide films by heating the stack to a temperature of from about 500 to about 700° C.; and
    (e) depositing a plurality of battery component films on the first surface of the substrate that cooperate with the stack of lithium cobalt oxide films to form a battery, the battery component films including an anode, electrolyte and current collector films, and the stack of lithium cobalt oxide films serving as a cathode of the battery.

12. A method according to claim 11 wherein (a) comprises sputter depositing a lithium cobalt oxide film on the first surface of the substrate to a thickness which is from about 0.25 to about 0.75 times the thickness of the completed stack of lithium cobalt oxide films.

13. A method according to claim 11 wherein (a) comprises
    (1) placing the substrate on a support in a process zone comprising a sputtering target composed of lithium cobalt oxide;
    (2) introducing a process gas into the process zone, the process gas comprising argon and oxygen;
    (3) maintaining the process gas in the process zone at a pressure of from about 5 to about 25 mTorr; and
    (4) applying current at a power density level of from about 0.1 to about 20 $W/cm^2$ to the sputtering target while maintaining the substrate at a potential of from about −5 to about −200 V.

14. A battery manufacturing method comprising:
    (a) depositing lithium cobalt oxide on the substrate by:
       (i) placing a substrate in a process zone such that a front surface of the substrate faces a lithium cobalt oxide target;
       (ii) introducing a process gas into the process zone;
       (iii) energizing the process gas to form a plasma to sputter the lithium cobalt oxide target to deposit a lithium cobalt oxide film on the front surface of the substrate; and
       (iv) exhausting the process gas from the process zone;
    (b) annealing the lithium cobalt oxide film to a temperature of from about 200 to about 400° C.;
    (c) repeating steps (a) and (b) to form a stack of lithium cobalt oxide films on the front surface of the substrate;
    (d) flipping the substrate over and performing steps (a) through (c) to deposit a second stack of lithium cobalt oxide films on a back surface of the substrate; and
    (e) annealing the stacked lithium cobalt oxide films on the front and back surface of the substrate by heating the films to a temperature of from about 500 to about 700° C.

15. A method of manufacturing a thin film battery, the method comprising:
    (a) providing a mica substrate;
    (b) annealing the mica substrate by heating the substrate to a temperature of at least about 540° C.;
    (c) depositing one or more battery component films on a the annealed mica substrate, the battery component films comprising an electrode film;
    (d) annealing the electrode film by heating the mica substrate to a temperature of from about 150 to about 600° C., whereby the electrode film annealing step eliminates electrical contact resistance defects in the electrode film to increase battery capacity by from about 10 to about 20% and increase charge and discharge current by more than 50%, as compared to the un-annealed film; and (e) depositing a plurality of other battery component films on the substrate that cooperate with the electrode film to form a battery, the other battery component films comprising at least another electrode film and an electrolyte.

16. A method according to claim 15 performed in a chamber comprising a substrate support facing a sputtering target, wherein step (a) comprises:
   (1) placing the substrate on the substrate support in the chamber;
   (2) providing a target comprising lithium cobalt oxide in the chamber;
   (3) introducing a process gas into the chamber;
   (4) energizing the process gas by applying a current at a power density level of from about 0.1 to about 20 W/cm² to the target, thereby sputtering material from the target to deposit an electrode film comprising lithium cobalt oxide onto the substrate; and
   (5) exhausting the process gas from the chamber.

17. A method according to claim 16 wherein the chamber comprises a magnetron-sputtering cathode, and the method comprises energizing the process gas by applying a potential across the target and the magnetron-sputtering cathode to form a plasma of the process gas having an ion flux of from about 0.1 to about 5 mA/cm².

18. A method according to claim 17 comprises maintaining the substrate at a potential of from about −5V to about −200V.

19. A method according to claim 17 further comprising applying a non-uniform magnetic field about the sputtering target in the chamber, the non-uniform magnetic field comprising a central field strength that is weaker than a peripheral field strength.

20. A method according to claim 15 wherein (b) comprises annealing the mica substrate by heating the substrate to a temperature of at least about 560° C.

21. A method according to claim 15 wherein the electrode film comprises a film thickness of at least about 10 microns.

22. A method of manufacturing a thin film battery, the method comprising:
   (a) annealing a substrate by heating the substrate to a temperature from about 540 to about 600° C., whereby water of crystallization present within the substrate structure is removed and contaminants and impurities are cleaned off the substrate; and
   (b) depositing a plurality of battery component films on the annealed substrate, the battery component films including a pair of electrodes with an electrolyte therebetween.

23. A method according to claim 22 comprising annealing the substrate for from about 10 minutes to about 120 minutes.

24. A method according to claim 22 comprising annealing the substrate in an oxygen-containing gas.

25. A method according to claim 22 comprising annealing the substrate by performing a plasma cleaning step in an oxygen-containing gas.

26. A thin film battery comprising:
   (a) a substrate having a planar surface;
   (b) an adhesion film on the planar surface of the substrate, the adhesion film comprising oxygen-exposed regions and covered regions; and
   (c) a plurality of battery component films on the covered regions of the adhesion film that cooperate to form a battery cell, the battery component films comprising at least a pair of electrodes and an electrolyte therebetween.

27. A battery according to claim 26 wherein the oxygen-exposed regions of the adhesion film are non-conducting.

28. A battery according to claim 26 wherein the oxygen-exposed regions of the adhesion film are in between a plurality of battery cells.

29. A battery according to claim 26 wherein the covered regions of the adhesion film cover at least about 20% of the entire area of the adhesion film.

30. A battery according to claim 26 wherein the adhesion film comprises a metal.

31. A battery according to claim 30 wherein the metal comprises aluminum, cobalt, titanium, or their alloys or compounds thereof.

32. A battery according to claim 30 wherein the oxygen-exposed regions of the adhesion film comprise a metal oxide.

33. A battery according to claim 26 wherein the battery component films include an electrode comprising a cathode film, a cathode current collector film, and an anode current collector film, and wherein at least a portion of the cathode current collector film directly contacts the covered region of the adhesion film.

34. A battery according to claim 33 wherein the battery component films include an electrode comprising an anode.

35. A battery according to claim 33 wherein the cathode current collector film comprises platinum.

36. A battery according to claim 33 wherein the anode current collector film comprises copper.

37. A method of manufacturing a thin film battery, the method comprising:
   (a) providing a substrate;
   (b) depositing an adhesion film on the substrate;
   (c) depositing on the adhesion film, a first battery component film comprising features that cover first regions of the adhesion film and expose second regions of the adhesion film;
   (d) depositing additional battery component films on the first battery component film to form a battery cell that includes at least a pair of electrodes and an electrolyte therebetween; and
   (e) after steps (c) or (d), heating the adhesion film to a temperature of at least about 200° C. in an oxygen-containing environment, thereby forming oxygen-exposed regions from the exposed second regions of the adhesion film.

38. A method according to claim 37 wherein the oxygen-exposed regions of the adhesion film are non-conducting regions.

39. A method according to claim 37 wherein the oxygen-exposed regions of the adhesion film are in between a plurality of battery cells formed on the substrate.

40. A method according to claim 37 wherein the features of the first battery component film cover at least about 20% of the entire area of the adhesion film.

41. A method according to claim 37 comprising forming a first battery component film comprising features composed of metal, and wherein (e) comprises oxidizing the exposed second regions to form metal oxide.

42. A method according to claim 41 wherein the metal comprises aluminum, cobalt, titanium, or their alloys or compounds thereof.

43. A thin film battery comprising:
   (a) a substrate having a planar surface;
   (b) an adhesion film on the planar surface of the substrate, the adhesion film comprising oxidized regions and non-oxidized regions; and
   (c) a plurality of battery component films on the non-oxidized regions of the adhesion film that cooperate to form a battery cell, the battery component films comprising at least a pair of electrodes and an electrolyte therebetween.

44. A battery according to claim 43 wherein the oxidized regions of the adhesion film are non-conducting.

45. A battery according to claim 43 wherein the adhesion film comprises aluminum, cobalt, titanium, or their alloys or compounds thereof.

46. A method of manufacturing a thin film battery, the method comprising:
(a) annealing a substrate by performing a plasma cleaning step in an oxygen-containing gas by heating the substrate to a temperature of from about 150 to about 600° C., whereby contaminants and impurities are cleaned off the substrate; and
(b) depositing a plurality of battery component films on the annealed substrate, the battery component films including a pair of electrodes and an electrolyte therebetween.

47. A method according to claim 46 comprising annealing the substrate to a temperature of at least about 200° C.

48. A method according to claim 46 comprising annealing the substrate to a temperature of at least about 400° C. for from about 10 minutes to about 120 minutes.

49. A method according to claim 46 comprising annealing the substrate to a temperature of at least about 540° C. whereby water of crystallization present within the substrate structure is removed.

* * * * *